Figure 1:
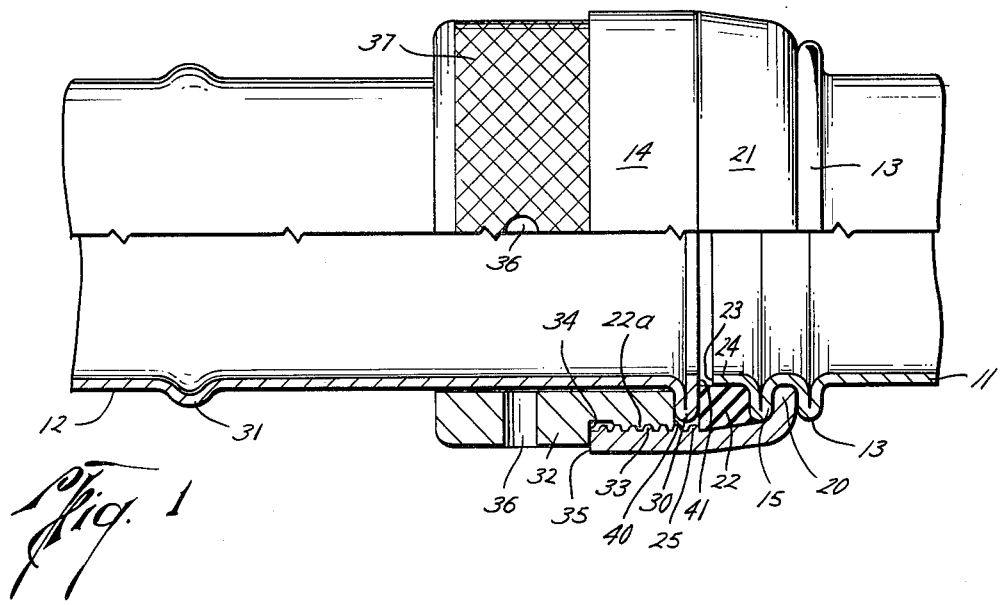

Sept. 21, 1965     W. B. KIMBRELL ETAL     3,207,534
PIPE CONNECTION
Filed Jan. 24, 1963

Willard B. Kimbrell
Sol B. Kimbrell
INVENTORS

BY *Murray Robinson*

ATTORNEY

United States Patent Office 3,207,534
Patented Sept. 21, 1965

3,207,534
PIPE CONNECTION
Willard B. Kimbrell, Wichita, and Sol B. Kimbrell, Great Bend, Kans., assignors to K & E Industries, Inc., Wichita, Kans., a corporation of Kansas
Filed Jan. 24, 1963, Ser. No. 253,658
2 Claims. (Cl. 285—55)

This invention pertains to pipes and pipe connectors. It is especially adapted for use with thin walled pipe.

It is not commercially practical to cut a thread on thin walled pipe whereby a threaded coupling could be used to connect two pipes, e.g., as in home water pipes. Likewise, it is not commercially practical to connect thin walled pipes by welding as is done in transmission line pipes of large size.

In considering what constitutes thin walled pipe one may refer to the gage number of the sheet metal from which the pipe is made, as set forth as pages 438, et seq., of Machinery's Handbook, 15th Edition, published by The Industrial Press. A pipe made of #14 gage sheet metal which has a wall thickness of 0.083 inch on the Birmingham or Stubs Iron Wire Gage would be a typical thin walled pipe. Cutting a thread on such a pipe would make it too weak, and welding such pipe without burning it would be difficult. It might be possible to cut a satisfactory thread on a #8 B. or S. gage pipe having a wall thickness of 0.165 inch if the sheet were of extra high quality as required for high pressure, but not on lower quality sheet used for low pressure pipe. Therefore #8 gage pipe may be considered as transitional between thin walled and thick walled pipe, and all higher gage numbers would be classified as thin walled.

The invention is applicable to pipe for both low pressure, e.g., below 600 p.s.i., and higher pressures. It is applicable to both ferrous (e.g., steel) and non-ferrous (e.g., aluminum) pipe.

The invention is applicable to both lined and unlined pipe and an embodiment illustrating application to rubberlined pipe will be described in addition to one for lined pipe.

According to the invention two thin walled pipes are connected by means of a threaded union. The union box has an inturned flange at one end which is fixedly secured between two external upsets on one pipe end both of which are spaced axially from the end face of the pipe. The union pin is a ring rotatably mounted on the other pipe end and axially slidable between two axially spaced external upsets on the other pipe end, one of which is at the extreme end of the pipe forming an enlarged end face. A solid rubber or other elastomer seal ring is disposed in the annulus between the union box and the pipe end on which the box is affixed, being snapped into position past the thread in the box. The box preferably has a tapered portion converging toward the flange end thereof so that when the rubber ring is pressed axially toward the flange end or bottom of the box the rubber ring is radially compressed to seal tightly against the pipe end. The box extends beyond the end of the pipe to which it is secured so the other pipe end can be inserted therein with its end face upset pushing axially against the rubber seal ring. In this position the union pin can be moved axially into the box and rotated to engage its screw thread with that of the box. A shoulder on the pin engages the mouth of the box to limit engagement thereof. In this position the pin will bear against the end face upset on one side thereof and the other side of the end face upset will bear against the rubber seal ring to press it into the annulus between box and pipe end.

Among the advantages of the invention are the strength of the connection (there being no cutting into the pipe ends), the excellent seal provided, the full opening through the connection, the shield of the seal ring against damage by cleaning tools, line fluid and other material passing through the pipe connection, the ability of the connection to be made up without rotating the pipe (which may be a problem with crooked pipe), the possibility of applying the holding wrench to the pipe rather than the union box during make up (because of their fixed relationship), the prevention of loss of the union parts which are both secured to the pipe ends by upsets and of the seal ring which is retained in the annulus between box and pipe end by the box threads, the protection of the pin by virtue of its being disposed entirely on the pipe without any portion extending beyond the pipe end, and the speed with which the connection can be made.

The rubber seal ring is of sufficient axial extent to prevent the end faces of the pipes from abutting, which is important to protect the lining of lined pipe. With a connection according to the invention, the rubber seal ring cooperates with the rubber lining of the pipe to keep line fluid from contracting any metal.

The invention is especially suitable for temporary pipe lines used in connection with a rotary drilling rig where a rugged connection that can be quickly made up and broken apart is especially desirable.

Figure 2:
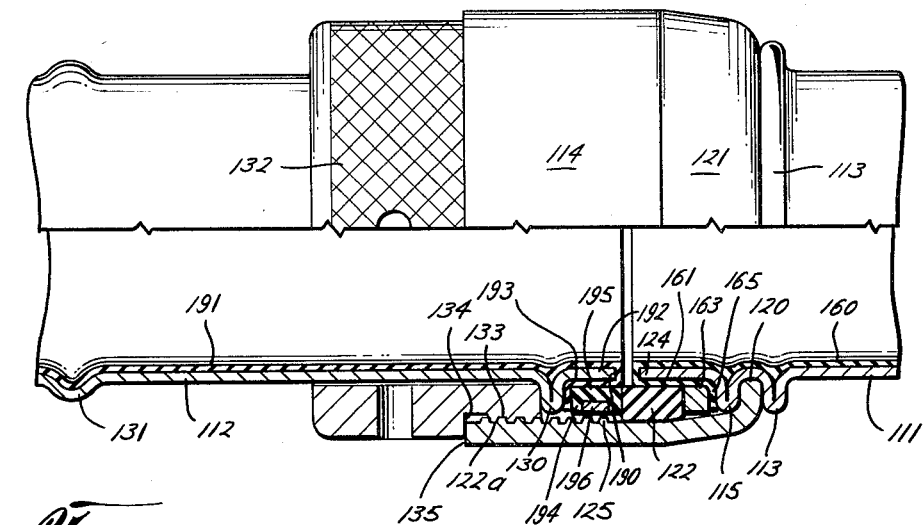

Other advantages and objects of the invention will appear from the following description of preferred embodiments thereof, reference being made to the accompanying drawings wherein;

FIGURE 1 is an elevation, partly in section, showing the conection of two unlined pipes according to the invention, and FIGURE 2 is a view similar to FIGURE 1 showing the invention as embodied in a connection between two rubber lined pipes.

Referring first to FIGURE 1, there are shown two pipe ends 11, 12. Pipe end 11 has been externally upset by axially loading same while a mandrel on the inside prevents internal collapse and with a set of dies therearound to form an external flange 13. This operation is preferably performed with the pipe cold, i.e., below the plastic temperature, so that the flange is formed by the pipe wall buckling and bending outward as shown, rather than by a simple thickening of the pipe wall as would occur if the pipe were at a plastic temperature. The upset flange according to the aforementioned process may be termed a buckled flange to distinguish it from a flange formed by plastic flow and wall thickening.

The above described cold process enables a flange of considerable radial extent to be formed readily without any expensive equipment, and the resulting flange is of great strength due to the cold working and the absence of any sharp corners on the outside of the pipe which might produce stress concentrations.

After flange 13 has been formed, union box 14 is placed on pipe end 11 against flange 13 and flange 15 is formed in a manner similar to flange 13. The procedure can be reversed with flange 13 formed first, the union box slipped over the other end of the pipe, and then flange 13 formed, but with a thirty foot length of pipe, as is usual, the first procedure is preferred.

The union box 14 is formed from a length of resistance welded steel tubing by first boring or turning the ends to a larger internal diameter, leaving a smaller diameter portion therebetween which is then threaded. After the thread is formed, flange 20 is formed by upsetting the end of the tube by applying axial loading with a mandrel inside the tube and forming dies on the outside. The conically tapered portion or bottom 21 of the box is formed at the same time.

The thread 22A formed inside the union box is preferably one having a flat crest, which is not easily damaged, and steep thread flanks to permit a low pitch useful to retain the rubber seal ring 22 as will be explained. A stub Acme thread as shown at page 994 of Machinery's Handbook is suitable.

The flange 15 on the box pipe end 11 is axially spaced from the end face 23 and the threaded portion of the box begins beyond the end face 23 so that there is formed an annulus between the box bottom 21 and the pipe tip 24 that extends from flange 15 to end face 23. The rubber seal ring 22 is pushed into this annulus and retained in position by the end turn 24 of thread 22. Because the thread has a flat crest and a low pitch, e.g., four turns per inch, the thread runout 25 presents a right angle shoulder extending almost 360 degrees. The runout 25 is axially spaced a short distance from the end face 23 and the rubber seal ring 22 extends beyond the end face 23 an equal amount so as to engage thread runout 25.

Pipe end 12 is upset to provide a flange 30 and a bead 31, preferably by cold upsetting similarly to the process by which flanges 13 and 15 were formed. The upsets (flange 30 and bead 31) on pipe end 12 are preferably formed one at a time, the bead 31 being formed first and then after pin ring 32 has been slipped over the pipe end, flange 30 is formed at the extremity of the pipe. However, the process could be reversed, flange 30 being formed first, then the pin ring applied, and the bead 31 formed. In fact, the pin ring could be put on the pipe before either upset was formed and then the upsets could be formed simultaneously or in any order. This procedure would also be applicable to the box ring 21 and flanges 13 and 15 which could be formed after the box ring 21 was put on the pipe and formed simultaneously or in any order.

The union pin, i.e., pin ring 32, is provided with a thread 33 on one end. Thread 33 is correlative to thread 22A on the union box (box ring 21). The other end of the pin is of larger diameter than the threaded end, providing a shoulder 34 therebetween to engage the end face 35 of the box and thereby limit the degree of engagement of pin and box.

There are a plurality of radial holes in the larger end of the pin for engagement with a lug wrench. The exterior surface 37 of the larger end of the pin is knurled to facilitate manual rotation of the pin into initial engagement with the box.

The length of the pin 32 is less than the distance between flange 30 and bead 31 by an amount at least as great as the distance from the end face 40 of the pin to the shoulder 34 so that the pipe end 12 can be fully inserted into the box 14 before any make up of the pin into the box. This facilitates proper engagement of the seal ring 22 and the enlarged pipe end face 41 provided by the side of flange 30 which is at the extremity of pipe end 12.

When the pin is screwed into the box after initial engagement of pipe end 12 in the box, the end face 41 presses the seal ring 22 into the tapered bottom of the box, thereby radially compressing it against the pipe tip 24 to seal therewith, while end face 41 seals against ring 22 by axial compression thereof.

Referring now to FIGURE 2, the construction there shown is substantially the same as that of FIGURE 1 and like parts are given the same reference numbers plus 100. Only the points of difference need be described.

FIGURE 2 shows the invention applied to rubber lined pipes. The rubber lining 160 on pipe end 111 is turned back over the outside of the pipe end forming a cuff 161. The cuff is retained in place by steel ring collar 163 pressed onto the cuff in sealing engagement therewith. An outturned flange 165 at the end of cuff 161 is gripped between one side of retainer collar 163 and the side of flange 115, improving the anchoring of the cuff.

The rubber seal ring 122 bears against the other side of collar 163 instead of against flange 115. The pipe tip 124 is longer than tip 24 of the FIGURE 1 embodiment, in order to accommodate both collar 163 and rubber seal ring 122. The unthreaded portion of box 114 is correspondingly increased so that rubber seal ring 122 can be received in the annulus between the pipe end and the box and retained by the thread runout 125A.

The flange 130 on the other pipe end 112 is axially spaced from the end face 190 of pipe end 112. This enables the rubber lining 191 of pipe end 112 to be turned back over the exterior of the pipe end over the tip 192 thereof forming a cuff 193. The cuff is held in place by retainer ring collar 194 pressed thereon in sealing engagement therewith.

Collar 194 is composed of a rubber body 195 with a steel hoop 196 therearound. Collar 194 is of the same axial length as pipe tip 192 plus the thickness of the rubber lining 191 and bears against seal ring 122 when the connection is made up. The steel hoop 196 is thus fully shielded from contact with line fluid.

The threaded portion of the box 114 is longer than that of the FIGURE 1 embodiment in order to span the cuff 194 as well as flange 130 to engage the thread 133 on the pin.

Similarly to the FIGURE 1 embodiment, shoulder 134 on the pin 132 engages end face 135 of the box when the connection is made up. In this position the flange 130 presses cuff 194 against seal ring 122. Similarly to the FIGURE 1 embodiment, seal ring 122 is radially compressed by the tapered bottom 121 of the box so as to seal against cuff 161, while the seal ring 122 is axially compressed to seal against collar 195.

In practicing the invention of both the FIGURE 1 and FIGURE 2 embodiments it is to be understood the pipes will be manufactured having on each length thereof a box union at one end and a pin union on the other whereby each end of the pipe can be connected to the correlative end of a like pipe.

Although preferred embodiments of the invention have been shown and described, many modifications thereof can be made by one skilled in the art without departing from the spirit of the invention, and it is intended to protect by Letters Patent all forms of the invention falling within the scope of the following claims:

We claim:

1. A pipe having an annular union box at one end and an annular union pin at the other end, said box having an inturned radial flange and said pipe having at said one end a pair of external upset buckled flanges between which said radial flange of the box is held fixedly against both axial motion and rotation, said buckled flanges being spaced axially from the end face of said one end of the pipe leaving a tip therebetween, said box having an unthreaded portion adjacent said inturned flange, said unthreaded portion including a tapered bottom converging toward said inturned flange, there being a rubber seal ring disposed in the annulus between said unthreaded portion and said tip, said box having a threaded portion adjacent said unthreaded portion, said threaded portion having a flat crested thread with steep flanks and the thread runout adjacent said unthreaded portion providing a right angle shoulder spaced axially beyond said end face of the pipe, said other end of the pipe having a pair of axially spaced annular outwardly projecting portions between which said pin is rotatably and axially slidably disposed, the one of said projecting portions nearest the end face of said other pipe end being disposed at the extreme outer end thereof and comprising an externally upset buckled flange, one end of said pin being adapted to bear against said flange, a portion of said pin adjacent said one end of the pin being threaded correlative to the box thread, the crest diameter of the pin thread exceeding the diameter of said flange on said other end of the pipe, said pin having a larger diameter portion adjacent said threaded portion, there being a shoulder formed therebetween adapted to engage the end face of a box like said box but on another piece of pipe in which position said one of said outwardly projecting portions is adapted to engage the rubber seal ring like said seal ring but on said other piece of pipe and compress same axially to form a seal therewith and to force same into the annulus inside a box like said box but on said other piece of pipe to compress the seal ring to seal with the tip of said other pipe, said annular outwardly projecting flange at said other end of the pipe being spaced axially from said extremity of the other end of the pipe leaving a tip therebetween, said pipe including a metal body portion with a rubber lining extending to the end faces at the ends of the pipe and turned back over said tip at said one end and said tip at the other end forming cuffs, and said pipe further including a steel collar over the cuff on the first said tip, and a second collar around the cuff on the second said tip, said second collar including a rubber body in sealing engagement with said cuff and a metal hoop therearound, said second collar being disposed at the extreme end of said other end of said pipe.

2. Combination according to claim 1 wherein said seal ring has a greater axial extent than the first said tip by an amount in excess of twice the thickness of said rubber lining, thereby to prevent the rubber lining turned back over the end face of the pipe adjacent the box from contacting with the rubber lining turned back over the end face of a like pipe adjacent the pin thereof.

References Cited by the Examiner

UNITED STATES PATENTS

| | | | |
|---|---|---|---|
| 1,533,886 | 4/25 | Mueller | 285—382.5 |
| 2,269,629 | 1/42 | Kreidel | 285—55 |
| 2,415,472 | 2/47 | Dorman | 285—356 |
| 2,463,336 | 3/49 | Weatherhead | 285—234 |
| 2,485,960 | 10/49 | Donahue | 285—382.5 |
| 2,825,588 | 3/58 | Howard | 285—382.5 |
| 3,100,656 | 8/63 | Mac Arthur | 285—55 |

FOREIGN PATENTS

| | | |
|---|---|---|
| 475,478 | 7/51 | Canada. |
| 690,552 | 4/40 | Germany. |
| 864,491 | 1/53 | Germany. |
| 406,764 | 3/34 | Great Britain. |
| 453,217 | 3/36 | Great Britain. |

CARL W. TOMLIN, *Primary Examiner.*